US009557907B2

(12) United States Patent
Park et al.

(10) Patent No.: US 9,557,907 B2
(45) Date of Patent: *Jan. 31, 2017

(54) DISPLAY DEVICE CAPTURING DIGITAL CONTENT AND METHOD OF CONTROLLING THEREFOR

(71) Applicant: LG ELECTRONICS INC., Seoul (KR)

(72) Inventors: Hyorim Park, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 429 days.

This patent is subject to a terminal disclaimer.

(21) Appl. No.: 14/104,892

(22) Filed: Dec. 12, 2013

(65) Prior Publication Data

US 2014/0289670 A1 Sep. 25, 2014

Related U.S. Application Data

(63) Continuation of application No. 13/918,469, filed on Jun. 14, 2013, now Pat. No. 8,635,552.

(Continued)

(30) Foreign Application Priority Data

May 23, 2013 (KR) ........................ 10-2013-0058393

(51) Int. Cl.
*G06F 3/0485* (2013.01)
*G06F 3/0484* (2013.01)
*G06F 3/0488* (2013.01)

(52) U.S. Cl.
CPC ........... *G06F 3/0485* (2013.01); *G06F 3/0488* (2013.01); *G06F 3/04842* (2013.01); *G06F 3/04845* (2013.01)

(58) Field of Classification Search
CPC .. G06F 3/04842; G06F 3/0485; G06F 3/0486; G06F 3/1242
See application file for complete search history.

(56) References Cited

U.S. PATENT DOCUMENTS 5,577,188 A * 11/1996 Zhu ........................ G06F 3/0481
715/202
7,269,794 B2 9/2007 Martinez et al.
(Continued)

FOREIGN PATENT DOCUMENTS

| EP | 2 474 903 A2 | 7/2012 |
| KR | 10-2008-0086196 A | 9/2008 |
| KR | 10-2013-0016655 A | 2/2013 |

OTHER PUBLICATIONS

"Snagit Scrolling Window NOT Working", Snagit Guide, Sep. 3, 2009, pp. 1-9, http://www.snagitguide.com/tag/snagit-9/.

(Continued)

*Primary Examiner* — Scott Baderman
*Assistant Examiner* — Mario M Velez-Lopez
(74) *Attorney, Agent, or Firm* — Birch, Stewart, Kolasch & Birch, LLP

(57) ABSTRACT

A method of controlling a display device according to one embodiment of the present specification includes the steps of displaying a digital content, displaying a capturing window in a manner of overlapping the digital content, wherein the capturing window captures an inside area of the capturing window, detecting a first control input moving the digital content on an inside of the capturing window, moving the digital content according to the first control input and including the digital content, which moved to the inside of the capturing window, in a capturing object, detecting a second control input moving the digital content on an outside of the capturing window, and moving the digital content according to the second control input and excluding (Continued)

the digital content, which moved to the inside of the capturing window by the second control input, from the capturing object.

1 Claim, 12 Drawing Sheets

Related U.S. Application Data

(60) Provisional application No. 61/803,772, filed on Mar. 20, 2013.

(56) References Cited

U.S. PATENT DOCUMENTS

| | | | |
|---|---|---|---|
| 7,689,926 B2 | 3/2010 | de Souza et al. | |
| 8,201,098 B1* | 6/2012 | Bollman | G06Q 10/107 |
| | | | 715/751 |
| 2003/0014252 A1* | 1/2003 | Shizuka | H04M 3/5307 |
| | | | 704/258 |
| 2003/0169296 A1* | 9/2003 | Ito | G06F 3/1205 |
| | | | 715/770 |
| 2004/0257346 A1* | 12/2004 | Ong | G06F 3/03545 |
| | | | 345/179 |
| 2005/0060656 A1* | 3/2005 | Martinez | H04L 12/1827 |
| | | | 715/751 |
| 2006/0041589 A1* | 2/2006 | Helfman | G06F 17/3089 |
| 2007/0234212 A1* | 10/2007 | de Souza | G06F 3/0481 |
| | | | 715/703 |
| 2008/0282160 A1* | 11/2008 | Tonnison | G06F 9/4443 |
| | | | 715/704 |
| 2008/0318636 A1* | 12/2008 | Kim | G06F 1/163 |
| | | | 455/566 |
| 2011/0221766 A1* | 9/2011 | Ko | G06F 3/1208 |
| | | | 345/629 |
| 2012/0010995 A1* | 1/2012 | Skirpa | G06F 3/0481 |
| | | | 705/14.49 |
| 2012/0188271 A1 | 7/2012 | Kim | |
| 2013/0054678 A1* | 2/2013 | Williams | G06F 17/243 |
| | | | 709/203 |
| 2013/0191774 A1* | 7/2013 | Choi | G06F 9/4443 |
| | | | 715/781 |
| 2013/0332878 A1 | 12/2013 | Sung | |

OTHER PUBLICATIONS

DuckLink Software, DuckCapture, Apr. 23, 2011, pp. 1-2, http://web.archive.org/web/20110423181205/http://www.ducklink.com/p/free-screen-capture-tool.

TechSmith Corp., Snagit Online Help Guide Version 8.1, pp. 1-284, http://download.techsmith.com/snagit/docs/onlinehelp/enu/snagit_help.pdf.

* cited by examiner

71

DISPLAY DEVICE CAPTURING DIGITAL CONTENT AND METHOD OF CONTROLLING THEREFOR

This application is a continuation application of U.S. application Ser. No. 13/918,469, filed on Jun. 14, 2013, which claims priority under 35. U.S.C. §119(e) to U.S. Provisional Application No. 61/803,772, filed on Mar. 20, 2013, and under 35. U.S.C. §119(a) to Korean Patent Application No. 10-2013-0058393, filed on May 23, 2013, all of which are hereby expressly incorporated by reference into the present application.

BACKGROUND OF THE INVENTION

1. Field of the Invention

The present specification relates to a display device, and more particularly, to a display device capturing digital content.

2. Discussion of the Related Art

A digital device may be able to display a digital content. The digital device may be able to download and display the digital content stored in an external server using a web browser. Yet, the digital content stored in the external server can be displayed only when the display device is connected to a network. Hence, in order to display the digital content of the external server while offline, which corresponds to the state to which the network is not connected, the display device may be able to store displayed digital content in a manner of capturing.

Yet, since the display device includes a limited display area, the display device may be able to display a part of the digital content only. In particular, a part of the digital content is displayed and a different part of the digital content may not be displayed. Hence, in case of capturing a displayed digital content, the display device may be able to store a part of the digital content. And, in order to store a whole area of the digital content, the display device may be able to capture and stores the whole area of the digital content in a manner of scrolling the digital content and dividing the digital content into a plurality of parts. Since the digital content captured in a manner of being divided into a plurality of parts is stored as separate image files, uniformity between the digital content and an original digital content may be reduced.

Hence, a method of storing the whole area of the digital content as one image file is required for the display device according to the present specification.

SUMMARY OF THE INVENTION

Accordingly, the present specification intends to provide a display device capturing digital content and a method of controlling therefor. In particular, according to the present specification, it is necessary for the display device to provide a method of determining whether a displayed digital content is included in a capturing object according to a position on which a control input is detected.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to one embodiment of the present specification includes a display unit configured to display a digital content and a capturing window indicating a capture area, a sensor unit configured to detect a control input for the display unit, and a controller configured to control the display unit and the sensor unit, the controller configured to display the capturing window in a manner of overlapping the digital content, if a first control input moving the digital content is detected on an inside of the capturing window, the controller configured to move the digital content according to the first control input and configured to include a first digital content, which moved to the inside of the capturing window by the first control input, in a capturing object, if a second control input moving the digital content is detected on an outside of the capturing window, the controller configured to move the digital content according to the second control input and configured to exclude a second digital content, which moved to the capturing window by the second control input, from the capturing object.

A method of controlling a display device according to one embodiment of the present specification includes the steps of displaying a digital content, displaying a capturing window in a manner of overlapping the digital content, wherein the capturing window captures an inside area of the capturing window, detecting a first control input moving the digital content on an inside of the capturing window, moving the digital content according to the first control input and including the digital content, which moved to the inside of the capturing window, in a capturing object, detecting a second control input moving the digital content on an outside of the capturing window, and moving the digital content according to the second control input and excluding the digital content, which moved to the inside of the capturing window by the second control input, from the capturing object.

It is to be understood that both the foregoing general description and the following detailed description of the present specification are exemplary and explanatory and are intended to provide further explanation of the invention as claimed.

Advantageous Effects

According to the present specification, a display device may be able to capture a digital content.

According to the present specification, a display device may be able to continuously capture a displayed area and a not displayed area of a digital content.

According to the present specification, a display device may be able to store an image file identical to an original file of a digital content.

According to the present specification, a display device may be able to capture a digital content by editing.

According to the present specification, a display device may be able to selectively capture only an area of which a user wants among a digital content.

According to the present specification, a display device may be able to display a preview of a captured digital content.

According to the present specification, a display device may be able to display a capturing window.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following description, embodiments are explained in detail with reference to the attached drawings and the contents written on them. A scope intended to claim may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The present specification relates to a method of continuously capturing displayed digital content in a display device. In the present specification, the display device may correspond to a smartphone, a smart pad, a tablet computer, or a note book. And, the display device may include a head mounted display. In case of a head mounted display, a user may be able to execute a capturing operation, which is described in the following description, in a manner of controlling an object displayed by augmented reality instead of controlling a display unit. And, in case of a head mounted display, a user may be able to execute a capturing operation, which is described in the following description, in a manner of controlling a projected object instead of controlling a display unit.

Figure 1:
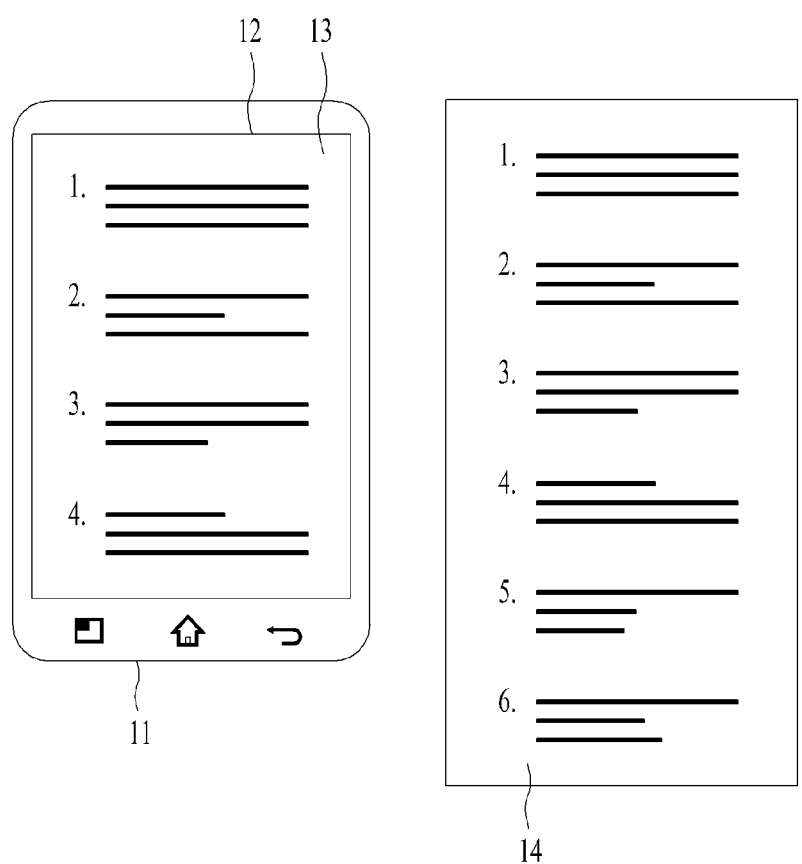
FIG. 1 is a diagram of a display device and digital content according to one embodiment of the present specification.

FIG. 1 is a diagram of a display device and digital content according to one embodiment of the present specification. A display device 11 may be able to include a display unit 12. The display device 11 may be able to display digital content 13 using the display unit 12. The digital content 13 displayed in the display unit 12 can be a part of an original digital content 14 due to a limited size of the display unit.

In case that a length of digital content 13 to be displayed is longer that the display unit 12, the display device 11 may be able to scroll the digital content on the display unit. As shown in the left of FIG. 1, a length of digital content capable of being displayed at the same time can be restricted due to a limited display area of the display unit 12 of the display device 11. As shown in the right of FIG. 1, in case that a length of an original digital content 14 is longer than a length of the display area of the digital device, the digital device may be able to display a part of the original digital content 14.

Referring to FIG. 1, the display device 11 may be able to display paragraphs from a first to a fourth, which corresponds to a part of the original digital content 14 including the paragraphs from the first to a sixth. The display device may be able to display paragraphs from a fifth to the sixth of the original digital content 14 by scrolling the displayed digital content 13.

Since the display unit 12 of the display device 11 is limited to its size, an area capable of being captured is limited to the digital content 13 displayed in the display unit in case that the displayed digital content is captured. Hence, as shown in the right of FIG. 1, in case of the original digital content 14 longer than the length of the display unit, there may exists inconvenience of capturing a plurality of times to capture the original digital content using a scroll for the digital content. In the following description, a method of continuous scroll capturing using a capturing window and the scroll is proposed.

Figure 2:
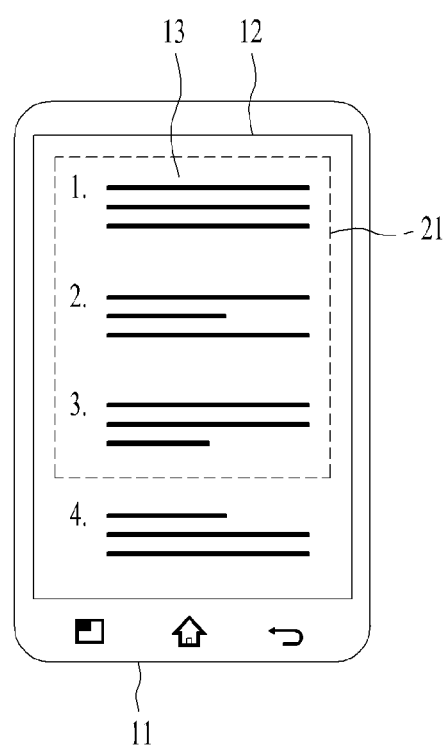
FIG. 2 is a diagram of a capturing window according to one embodiment of the present specification.

FIG. 2 is a diagram of a capturing window according to one embodiment of the present specification. The capturing window 21 can be displayed in the display unit 12 of the display device 11. Although the capturing window 21 is depicted as a quadrangle in FIG. 2, its form and shape can vary according to embodiment. In particular, the capturing window 21 can be generated according to a shape designated by a user or a shape dragged by a user. In case that a user drags a straight line in the display unit 13, the display device may be able to configure an area to be captured using the straight line. For instance, the display device 11 may be able to configure an upper part or a lower part of the straight line, which is dragged by the user, as the area to be captured.

The display device may be able to capture digital content 13 displayed in the capturing window 21. The display device receives a capture input of a user and may be then able to store the digital content 13 displayed in the capturing window as an image file. Referring to FIG. 2, the display device 11 may be able to capture the content from a first paragraph to a third paragraph included in the capturing window 21 among the displayed digital content 13.

Figure 3:
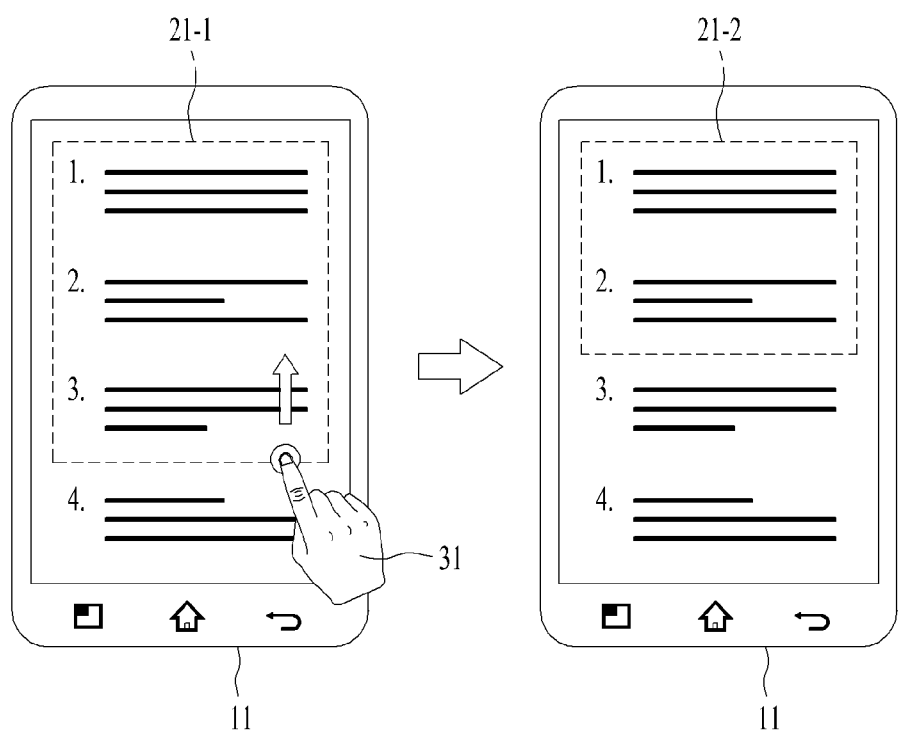
FIG. 3 is a diagram showing a method of controlling a size of a capturing window according to one embodiment of the present specification.

FIG. 3 is a diagram showing a method of controlling a size of a capturing window according to one embodiment of the present specification. The display device 11 may be able to control a size of a capturing window by detecting a control input 31 for the capturing window 21-1 displayed in the display unit. The display device may be able to modify the size or a shape of the capturing window according to the control input 31 and the digital content displayed in the modified capturing window 21-2 can become an object of capturing.

Referring to the left of FIG. 3, the display device 11 may be able to display the capturing window 21-1 including the paragraphs from the first to the third of the digital content. If the content to be captured corresponds to the first paragraph and the second paragraph, the display device may be able to modify a shape and a size of the capturing window. The display device may be able to detect the control input 31 for the capturing window 21-1. If the control input 31, which selects and drags the capturing window 21-1, is detected, the display device 11 may be able to modify the size of the capturing window 21-1 according to the control input. By doing so, as shown in the right of FIG. 3, the display device 11 may be able to display a capturing window 21-2 having a modified size or a modified shape. The display device 11 may be able to capture the content of the first paragraph and the second paragraph included in the modified capturing window 21-2.

Figure 4:
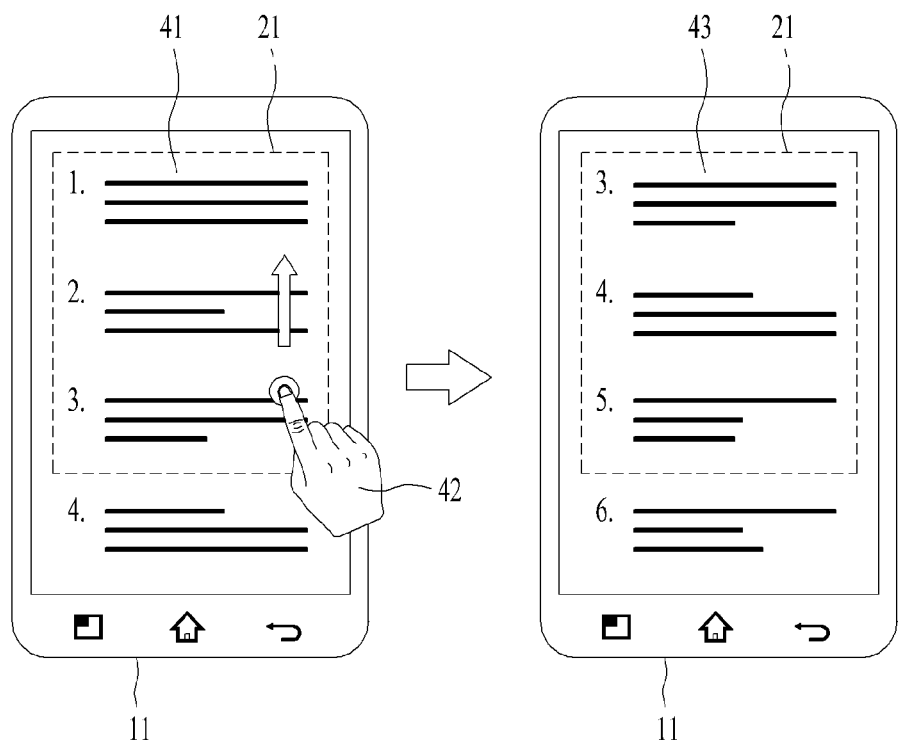
FIG. 4 is a diagram showing a method of a scroll capturing according to one embodiment of the present specification.

FIG. 4 is a diagram showing a method of a scroll capturing according to one embodiment of the present specification. The display device may be able to store a digital content to be scrolled as one image file in a manner of continuously capturing the digital content. As shown in the left of FIG. 4, the display device 11 may be able to display paragraphs from a first to a fourth of a digital content 41. As shown in the left of FIG. 4, a capturing window 21 may be able to include the paragraphs from the first to a third. A user touches inside of the capturing window 21 and may be able to scroll the digital content 41 displayed in the display unit. The display device 11 detects a control input 42 of the user inside area of the capturing window 21 and may be then able to scroll the digital content 41 according to the control input 42 of the user.

The display device 11 scrolls the digital content 41 according to the control input of the user and may be able to display a scrolled digital content 43 as shown in the right of FIG. 4. As a result of scrolling, the display device 11 may be able to display paragraphs from a third to a sixth of the digital content 43 in the display unit. In this case, the display device 11 may be able to include the paragraphs from the third to the fifth in the capturing window.

The display device 11 may be able to include the paragraphs from the first to the third, which are included in the capturing window 21 before the control input, and the paragraphs from the fourth to the fifth, which are included in the capturing window 21 in a manner of being scrolled by the control input 42, in an object of capturing. The display device may be able to capture the third paragraph, which is included in the capturing window of the left and right of FIG. 4 in a manner of being overlapped, only once. Regarding a captured image, it shall be explained in FIG. 5.

If a control input is completed and time more than a time threshold goes by, the display device 11 stops selecting for capturing object and may be able to capture the digital content included in the capturing object. And, as a different embodiment, the display device 11 detects a control input making a capture end and may be able to capture the digital content included in the capturing object.

If a sixth paragraph is also included in the capturing window in a manner that the control input scrolls the digital content in the aforementioned embodiment, the display device may be able to include the paragraphs from the first to the sixth in the capturing object.

Figure 5:
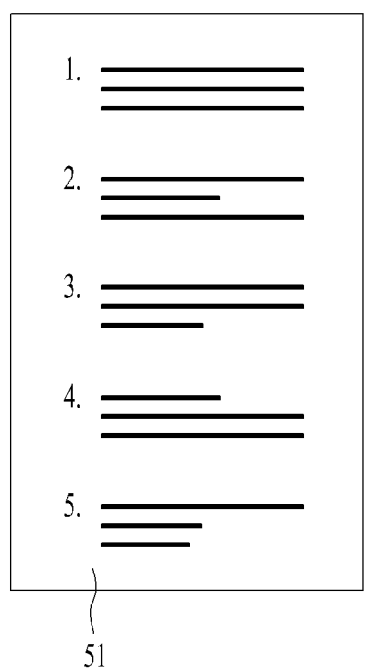
FIG. 5 is a diagram showing a result of capturing digital content as an image file according to one embodiment of the present specification.

FIG. 5 is a diagram showing a result of capturing digital content as an image file according to one embodiment of the present specification. FIG. 5 indicates a captured image 51 captured by a control input, which scrolls inside of the capturing window described in FIG. 4. The display device may be able to store the paragraphs included in the capturing object in a manner of capturing. The digital device may be able to store the paragraphs from the first to the fifth, which are unable to be simultaneously displayed due to a limited size of the display unit, as one image file. As mentioned in the foregoing description, the display device may be able to store a digital content longer than the length of the display unit as one image file via a scroll capture method. In particular, a user may be able to capture a digital content of a preferable length from an original digital content depicted in the right of FIG. 1 and may be able to store the digital content.

In FIG. 4, if the paragraphs from the first to the sixth are included in the capturing object, the display device may be able to capture an image identical to the original digital content 14 depicted in the right of FIG. 1 and store the image. In particular, although a size or resolution of the display unit is limited, the display device may be able to capture the image identical to the original digital content and store the image as an image file.

Figure 6:
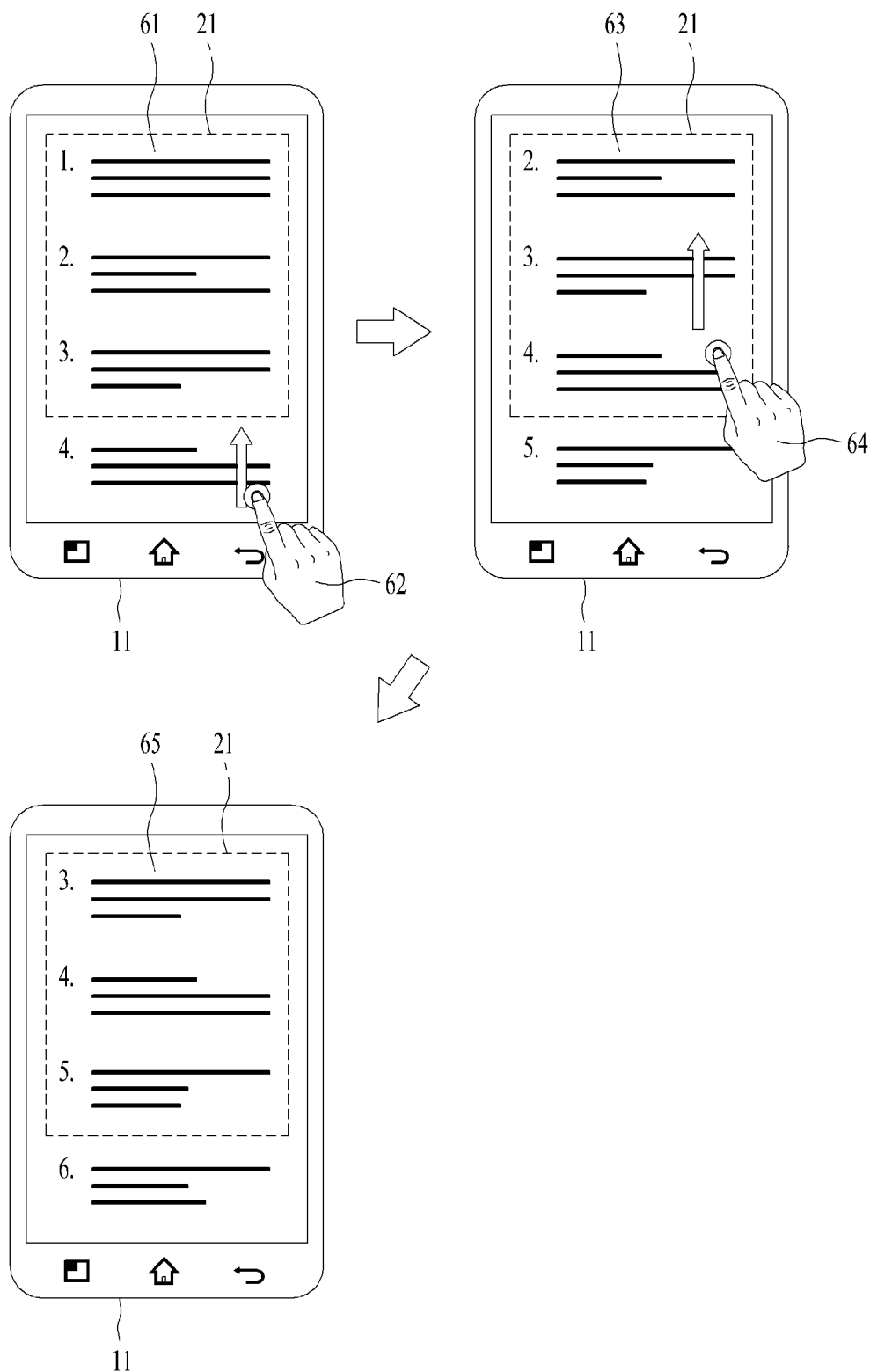
FIG. 6 is a diagram showing a method of discontinuous capturing according to one embodiment of the present specification.

FIG. 6 is a diagram showing a method of discontinuous capturing according to one embodiment of the present specification. Referring to the top left of FIG. 6, the display device 11 may be able to display a digital content 61 including paragraphs from the first to the fourth. The display device may be able to display a capturing window 21 in a manner of overlapping the digital content 61. Referring to the top left of FIG. 6, the displayed capturing window 21 may be able to include paragraphs from the first to a third. The paragraphs from the first to the third included in the capturing window 21 can be included in a capturing object.

A user touches outside of the capturing window 21 and may be able to scroll the displayed digital content 61. The display device 11 detects a control input 62 of the user on an outside area of the capturing window 21 and may be able to scroll the digital content 61 according to the control input 62. The display device 11 scrolls the digital content 61 according to the control input 62 and may be able to display a digital content 63 including the paragraphs from the second to the fifth in the display unit as shown in the top right of FIG. 6. In this case, the capturing window 21 may include the paragraphs from the second to the fourth. The display device 11 may be able to pause a capturing operation for a part of the digital content, which is newly included in the capturing window 21 in a manner of being scrolled by the control input 62 detected on the outside of the capturing window, i.e., the fourth paragraph. In other word, the display device 11 may be able to exclude the part of the digital content, which is newly included in the capturing window 21 in a manner of being scrolled by the control input 62 detected on the outside of the capturing window 21, from the capturing object.

In case that the control input 62 detected on the outside of the capturing window 21 moves to an inside of the capturing window while maintaining a contact with the display unit, the display device 11 may be able to recognize the control input detected on the inside of the capturing window 21 like as if the control input were detected on the outside of the capturing window.

Referring to the top right of FIG. 6, a user touches the inside of the capturing window 21 and may be able to scroll the displayed digital content 62. The display device 11 detects a control input 64 of the user on the inside area of the capturing window 21 and may be able to scroll a digital content 63 according to the control input 64. The display device 11 scrolls the digital content 63 according to the control input and may be able to display a digital content 65 including the paragraphs from the third to the sixth in the display unit as shown in the bottom left of FIG. 6. In this case, the capturing window 21 may include the paragraphs from the third to the fifth. The display device 11 may be able to resume a capturing operation for a part of the digital content, which is newly included in the capturing window 21 in a manner of being scrolled by the control input 64 detected on the inside of the capturing window, i.e., the fifth paragraph. In particular, after pausing the capturing operation as shown in the top right of FIG. 6, the display device 11 may be able to include the part of the digital content, which is newly included in the capturing window 21 in a manner of being scrolled by the control input 64 detected on the inside of the capturing window 21, in the capturing object.

In case that the control input 64 detected on the inside of the capturing window 21 moves to an outside of the capturing window while maintaining a contact with the display unit, the display device 11 may be able to recognize the control input detected on the outside of the capturing window 21 like as if the control input were detected on the inside of the capturing window.

Figure 7:
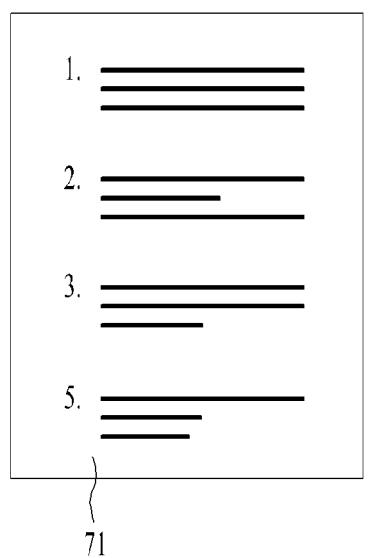
FIG. 7 is a diagram showing a result of capturing digital content as an image file according to one embodiment of the present specification.

FIG. 7 is a diagram showing a result of capturing digital content as an image file according to one embodiment of the present specification. FIG. 7 indicates a capture image 71 captured by the control input, which scrolls the outside/inside of the capturing window described in FIG. 6. The display device captures the paragraphs included in a capturing object and may be able to store the paragraphs. The display device may be able to store the paragraphs from the first to the third and the fifth paragraph, which exist discontinuously in a digital content, as one image file. As mentioned in the foregoing description, by separately detecting a scroll of an inside of the capturing window and the scroll of an outside of the capturing window, the display device may be able to selectively capture a part that a user wants only. In particular, the user selectively captures a preferable part of the digital content from the original digital content depicted in the right of FIG. 1 and may be able to store the part.

In FIG. 4, if the paragraphs from the first to the sixth are included in a capturing object, the display device may be able to store an image file, which excludes the fourth paragraph from the original digital content 14 depicted in the right of FIG. 1. In particular, the display device selectively includes a digital content greater than a limited size or resolution of the display unit in a capturing object and may be able to store the digital content as an image file by capturing the digital content.

Figure 8:
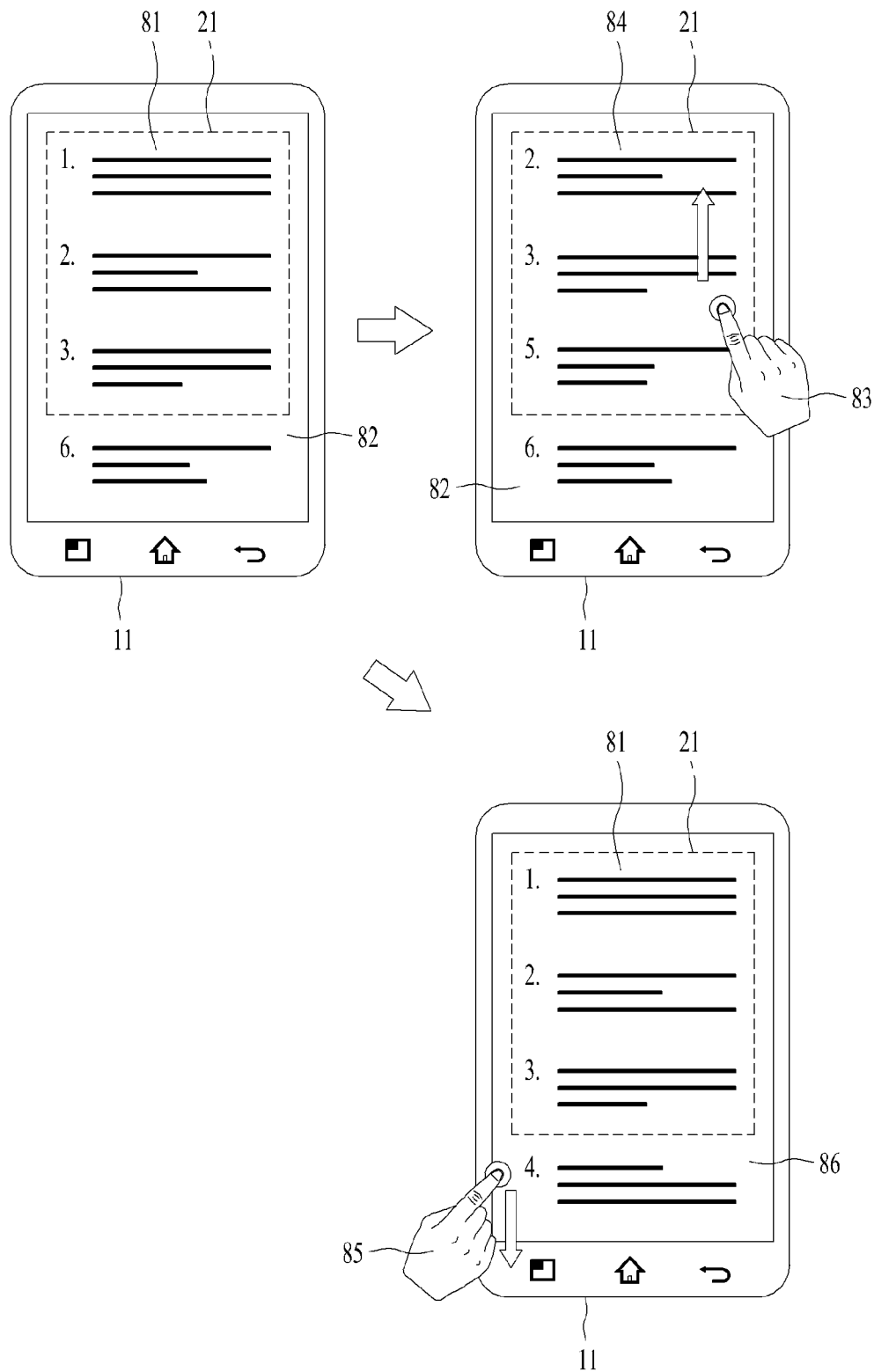
FIG. 8 is a diagram showing a method of displaying a result of capturing of a display device according to one embodiment of the present specification.

FIG. 8 is a diagram showing a method of displaying a result of capturing of a display device according to one embodiment of the present specification. The display device 11 may be able to display a capture image 81 in the capturing window 21. Referring to the top left of FIG. 8, the display device may be able to display a preview of the capture image 81 of FIG. 7. The display device 11 may be able to display a part of the capture image, which corresponds to the paragraphs from the first to the third, in the capturing window 21. The display device may be able to display a digital content 82, which was the capturing object, in the outside of the capturing window 21. In particular, the display device may be able to display a sixth paragraph, which corresponds to a part of the digital content 82, in the outside of the capturing window 21.

The display device 11 may be able to independently scroll each of the inside area and the outside area of the capturing window 21. In case that a first control input 83 is detected in the capturing window 21, the display device 11 scrolls the displayed capture image 81 and may be able to display a scrolled capture image 84 in the capturing window 21. As shown in the top right of FIG. 8, the display device 11 may be able to display the scrolled capture image 84 including the second, third, and fifth paragraph in the capturing window 21 by scrolling the capture image 81. The display device 11 may be able to make the content displayed outside of the capturing window 21 not to be scrolled although a first control input 83 is detected. Hence, the display device 11 may be able to maintain the sixth paragraph displayed in the outside of the capturing window 21.

In case that a second control input 85 is detected in an outside of the capturing window 21, the display device 11 scrolls the displayed digital content 82 and may be able to display a scrolled digital content 86. As shown in the bottom right of FIG. 8, the display device 11 may be able to display the scrolled digital content 86 including a fourth paragraph in the outside of the capturing window 21 by scrolling the digital content 82. The display device 11 may be able to make the capture image 81 displayed in the capturing window 21 not to be scrolled although the second control input 85 is detected. Hence, the display device 11 may be able to maintain the paragraphs from the first to third displayed in the capturing window 21.

As mentioned in the foregoing description, a user may be able to control a capture image or a digital content in a manner of scrolling an inside area or an outside area of the capturing window, respectively.

Figure 9:
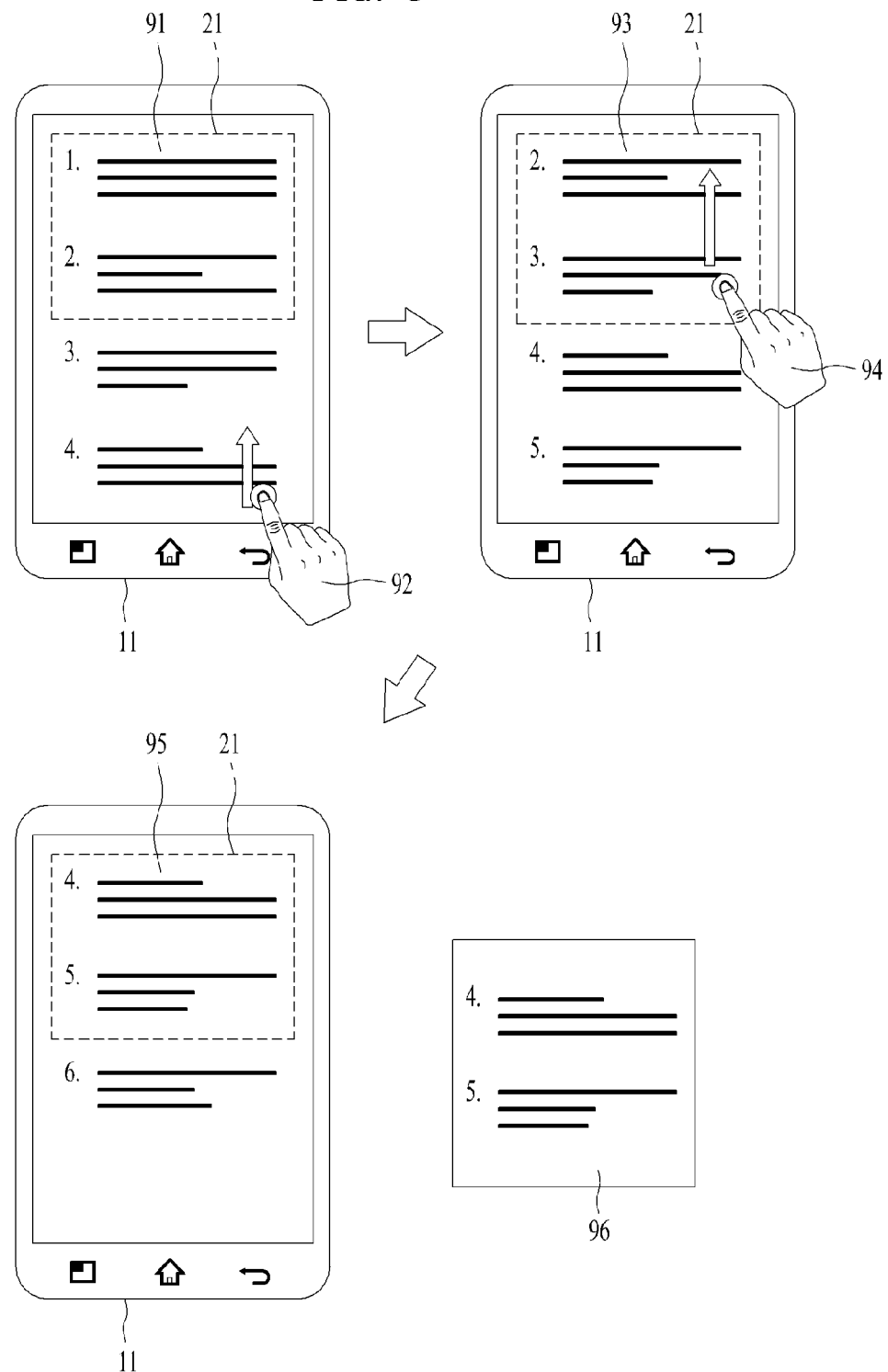
FIG. 9 is a diagram showing a method of a scroll capturing according to a different embodiment of the present specification.

FIG. 9 is a diagram showing a method of a scroll capturing according to a different embodiment of the present specification. The display device may be able to store a digital content to be scrolled as one image file in a manner of continuously capturing the digital content. As shown in the top left of FIG. 9, the display device 11 may be able to display paragraphs from a first to a fourth of a digital content 91. As shown in the top left of FIG. 9, a capturing window 21 may be able to include the paragraphs from the first to a second. A user touches an outside of the capturing window 21 and may be able to scroll the digital content 91 displayed in the display unit. The display device 11 detects a first control input 92 in the outside area of the capturing window 21 and may be then able to scroll the digital content 91 according to the first control input 92.

The display device 11 scrolls the digital content 91 according to the first control input 92 and may be able to display a scrolled digital content 93 as shown in the top right of FIG. 9. As a result of scrolling, the display device 11 may be able to display the paragraphs from the second to a fifth of the digital content 93 in the display unit. In this case, the display device 11 may be able to include the paragraphs from the second to the third in the capturing window.

The display device 11 may be able to exclude the digital content, which was included in the capturing window 21 before the first control input 92 is inputted, from a capturing object. And, since the first control input 92 is detected on the outside of the capturing window 21, the display device 11 may be able to exclude the digital content, which is moved to the inside of the capturing window 21 by the first control input 92, from the capturing object. In particular, the display device may be able to exclude the paragraphs from the first to the second, which were included in the capturing window 21 before the first control input is inputted, and the third paragraph, which is included in the capturing window 21 in a manner of being scrolled by the first control input 92, from the capturing object.

A user touches the inside of the capturing window 21 and may be able to scroll the displayed digital content 93. The display device 11 detects a second control input 94 on an inside area of the capturing window 21 and may be able to scroll the digital content 93 according to the second control input 94.

The display device 11 scrolls the digital content 93 according to the second control input 94 and may be able to display a scrolled digital content 95 as shown in the bottom left of FIG. 4. As a result of the scrolling, the display device may be able to display the paragraphs from a fourth to a sixth of the digital content 93. In this case, the display device may be able to include the paragraphs from the fourth to the fifth in the capturing window 21.

The display device 11 may be able to include the paragraphs from the fourth to the fifth, which are included in the capturing window 21 in a manner of being scrolled by the second control input 94, in a capturing object. The digital device 11 may be able to store the paragraphs from the fourth to the fifth, which are included in the capturing object, as an image file by capturing. The bottom right of FIG. 9 is a diagram indicating a capture image 96. The capture image may include the paragraphs from the fourth to the fifth included in the capturing object.

Figure 10:
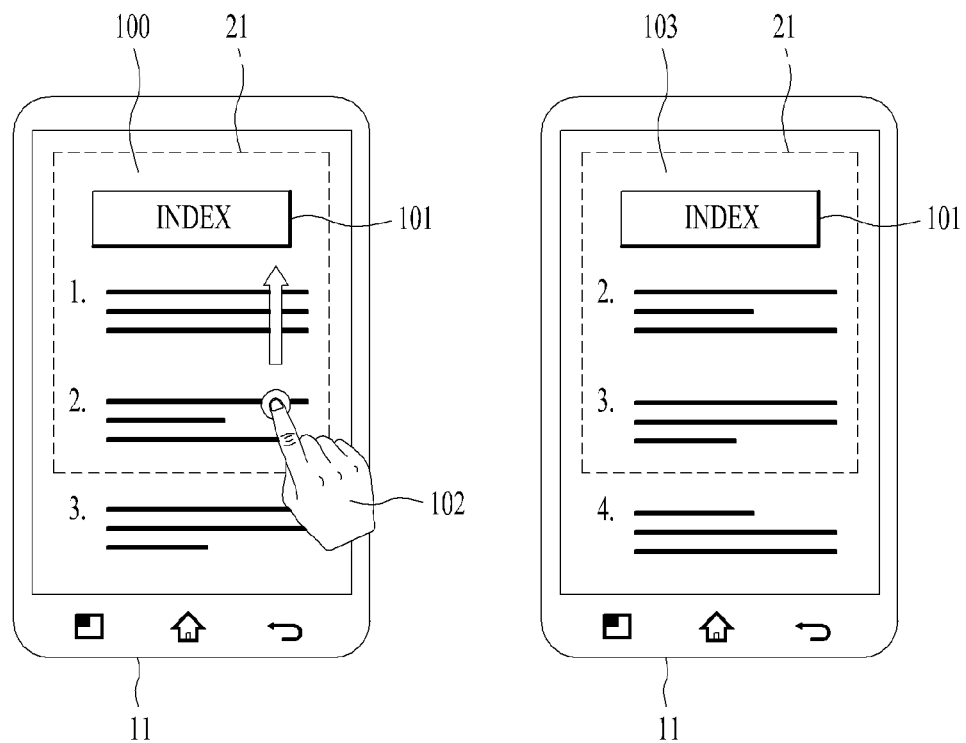
FIG. 10 is a diagram showing a method of capturing digital content including a fixed object according to one embodiment of the present specification.
Figure 10:
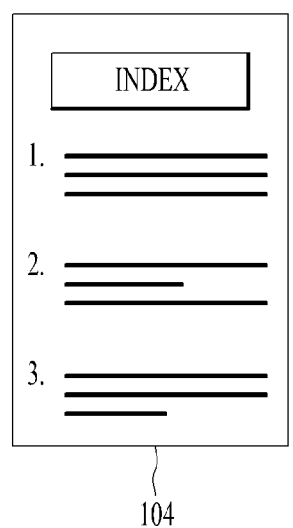

FIG. 10 is a diagram showing a method of capturing a digital content including a fixed object according to one embodiment of the present specification. The display device 11 may be able to prevent a part, which is fixed its position in the capturing window 21 and not scrolled by a control input, from a duplicated capture. As shown in the top left of FIG. 10, the display device 11 may be able to display a fixed area 101 and a digital content 100 including paragraphs from a first to a third. The display device 11 may be able to display a capturing window 21 including the fixed area 101, the first paragraph, and a second paragraph.

The display device 11 detects a control input 102 scrolling the digital content 100 in the capturing window and may be able to scroll the digital content 100. As shown in the top right of FIG. 10, the display device 11 may be able to scroll the digital content 100 while displaying the fixed area 101 in an identical position. Consequently, the display device may be able to display the fixed area, the second paragraph, and the third paragraph in the capturing window 21. The display device 11 may be able to capture the fixed area 101, which is commonly included in the capturing window 21 in the top left and the top right of FIG. 10, only one time without a duplicated capture. Hence, the display device 11 may be able to include the fixed area 101, the first paragraph, the second paragraph, and the third paragraph, which are included in the capturing window 21 before and after the control input 102, in the capturing object. And, the display device may be able to capture an image including the fixed area 101, the first paragraph, the second paragraph, and the third paragraph. The bottom of FIG. 10 is a diagram indicating a capture image 104.

Figure 11:
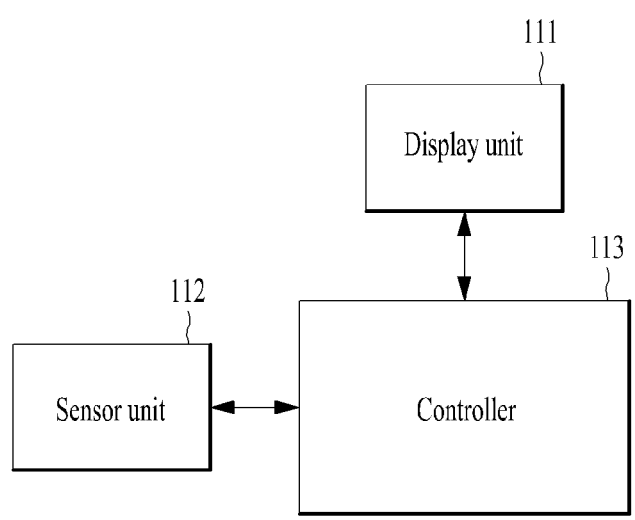
FIG. 11 is a block diagram of a display device according to one embodiment of the present specification.

FIG. 11 is a block diagram of a display device according to one embodiment of the present specification. The display device may be able to include a display unit 111, a sensor unit 112, and a controller 113.

The display unit 111 is configured to display a digital content. The display unit 111 is able to display a capturing window in a manner of overlapping the digital content. The display unit 111 may have lower resolution compared to the digital content. In this case, the display unit 111 may be able to display a part of the digital content. And, the display unit 111 may be able to further display a not displayed part in a manner of scrolling the digital content.

The display unit 111 may include at least one selected from the group consisting of an organic light emitting diode (OLED), a liquid crystal display (LCD), an e-ink, a head mounted display (HMD), and a flexible display according to embodiment.

The sensor unit 112 is configured to detect a control input of a user. The sensor unit 112 is able to detect the control input inputted to an inside or an outside of a capturing window. The control input may correspond to one of a touch input, inclination for a display device, an input by an input device, a voice input, or a gesture input. In this case, the input device may include a mouse, a keyboard, or a remote controller. The sensor unit may be able to detect various control inputs using at least one selected from the group consisting of a touch sensor, a gyro sensor, an acceleration sensor, an image sensor, and a voice recognition sensor.

The sensor unit 112 may be able to deliver information on a detected control input of a user to the controller. The information on the control input may include the information on a position on which the control input is detected in the display unit.

The aforementioned display unit 111 and the sensor unit 112 can be implemented as a single touch sensitive display unit according to embodiment. In this case, the touch sensitive display unit may include a resistive touch panel or a capacitive touch panel.

The controller 113 is configured to control the display unit using the information delivered from the sensor unit 112 and may be able to capture a displayed digital content. The controller 113 is able to control the display unit and the sensor unit. The controller 113 may be able to display the digital content and a capturing window using the display unit. The controller 113 may be able to detect whether the control input scrolling the digital content is sensed on an inside of the capturing window. If the control input moving the digital content is detected on the inside of the capturing window, the controller 113 may be able to move the digital content according to the control input. And, the controller 113 may be able to include a part of the digital content, which moved to the inside of the capturing window by the control input, in the capturing object.

If the control input moving the digital content is detected on an outside of the capturing window, the controller 113 may be able to move the digital content according to the control input. And, the controller 113 may be able to exclude a part of the digital content, which moved to the inside of the capturing window by the control input, from the capturing object.

The controller 113 may be able to generate one image file in a manner of combining the parts of the digital content included in the capturing object. The controller 113 may be able to display the generated capture image in the capturing window.

FIG. 11 is a block diagram of a display device according to one embodiment of the present specification. Blocks represented as being separated are depicted for elements of the display device in a manner of being logically distinguished. Thus, the aforementioned elements of the display device may be equipped with a single chip or a plurality of chips.

Figure 12:
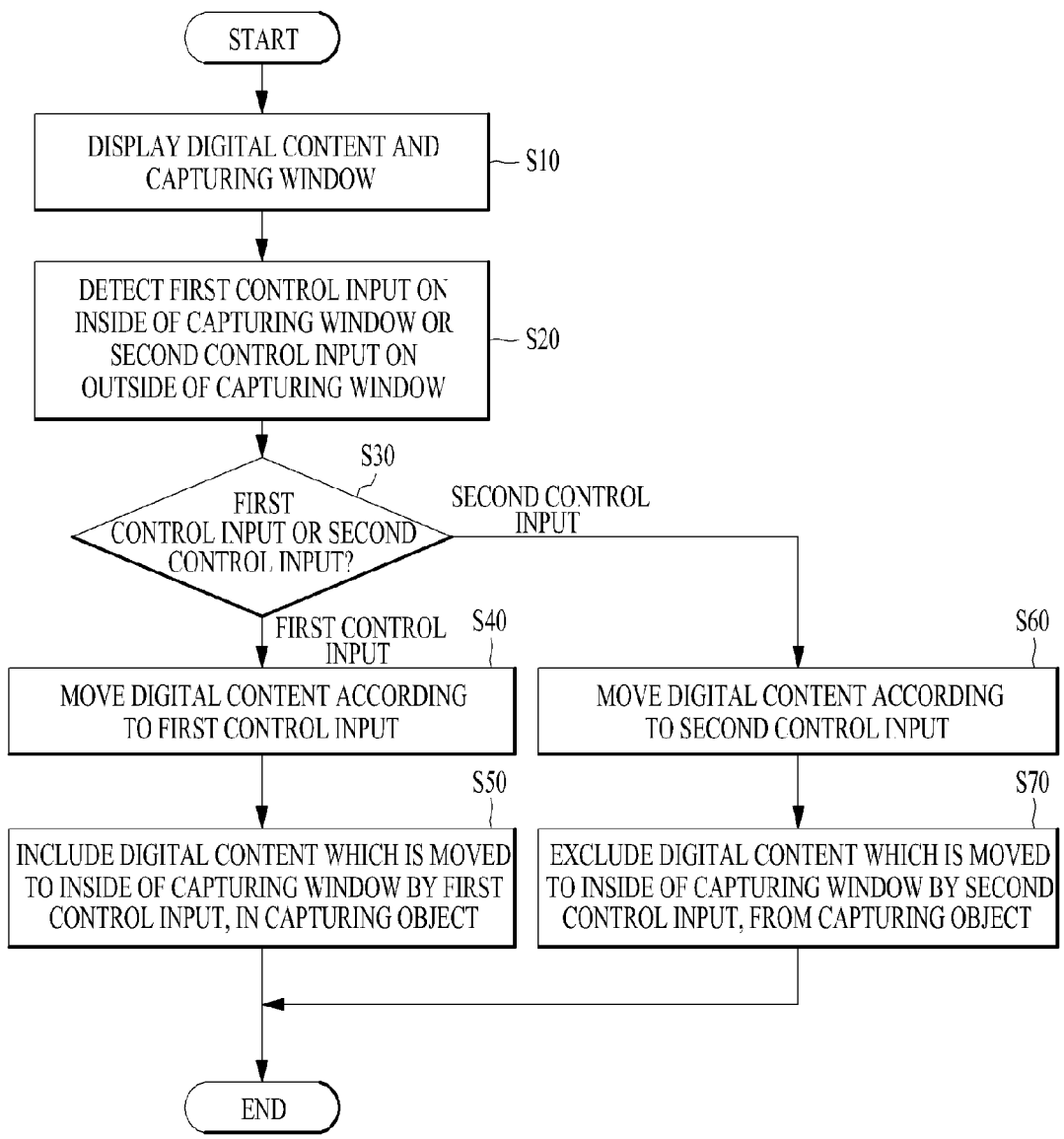
FIG. 12 is a flowchart showing a method of capturing digital content according to one embodiment of the present specification.

FIG. 12 is a flowchart showing a method of capturing digital content according to one embodiment of the present specification. The display device may be able to display a digital content and a capturing window [S10]. As described in FIG. 1, if resolution of the display device is lower than the resolution of the digital content, the display device may be able to display a part of the digital content only. As described in FIG. 2, the display device may be able to display a capturing window in a manner of overlapping the digital content. The capturing window may be able to indicate an area for which the display device is going to capture. As described in FIG. 3, at least one of a size, shape, and a position of the capturing window can be modified by a control input.

The display device may be able to detect a first control input for an inside of the capturing window or a second control input for an outside of the capturing window [S20]. As described in FIG. 4 and FIG. 6, the display device may be able to detect a position where a control input is inputted in the display unit using the sensor unit. The display device may be able to detect the control input using a resistive touch panel or a capacitive touch panel.

The display device may be able to judge which control input is inputted among the first and the second control input [S30]. If a control input is detected on an inside of the capturing window, the display device may be able to judge the control input as the first control input. If a control input is detected on an outside of the capturing window, the display device may be able to judge the control input as the second control input. Although the control input detected on the inside of the capturing window moves to the outside of the capturing window while maintaining a contact with the display unit, the display device may be able to judge the control input as the first control input. And, although the control input detected on the outside of the capturing window moves to the inside of the capturing window while maintaining a contact with the display unit, the display device may be able to judge the control input as the second control input.

The display device may be able to move the digital content according to the first control input [S40]. As described in FIG. 4 and FIG. 6, the display device may be able to move the digital content according to a moving direction or a speed of the first control input. If a digital content of higher resolution compared to the resolution of the display unit is displayed, the display device may be able to display a not displayed part of the digital content in a manner of scrolling the digital content.

The display device may be able to include the digital content, which moved to the inside of the capturing window by the first control input, in a capturing object [S50]. As described in FIG. 4 and FIG. 6, the display device may be able to include a part of the digital content, which moved to the capturing window by the first control input, in the capturing object. The display device captures one image in a manner of combining the parts of the digital content included in the capturing object and may be able to store the captured image as an image file.

The display device may be able to move the digital content according to a second control input [S60]. As described in FIG. 6, the display device may be able to move the digital content according to a moving direction or a speed of the second control input. If a digital content of higher resolution compared to the resolution of the display unit is displayed, the display device may be able to display a not displayed part of the digital content in a manner of scrolling the digital content.

The display device may be able to exclude the digital content, which moved to the inside of the capturing window by the second control input, from the capturing object [S70]. As described in FIG. 6, the display device may be able to exclude a part of the digital content, which moved to the inside of the capturing window by the second control input, from the capturing object. The display device may be able to make the parts of the digital content, which are excluded from the capturing object, not to be included in an image file to be stored as well as a capture image.

As mentioned in the foregoing description, the display device according to the present specification may be able to determine whether the displayed digital content is included in the capturing object according to a position on which a control input is detected. And, the display device may be able to generate a capture image of higher resolution compared to the resolution of the display unit.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A display device, comprising:
   a display unit configured to display digital content and a capturing window indicating a capture area;
   a sensor unit configured to detect a control input for the display unit; and
   a controller configured to control the display unit and the sensor unit,
   wherein if a first control input moving the digital content is detected on an inside of the capturing window,
   the controller is further configured to
   move the digital content according to the first control input, and
   include a first digital content, which is moved to the inside of the capturing window by the first control input, in a capturing object,
   wherein if a second control input moving the digital content is detected on an outside of the capturing window,
   the controller is further configured to
   move the digital content according to the second control input, and
   exclude a second digital content, which is moved to the inside of the capturing window by the second control input, from the capturing object,
   wherein the controller is further configured to generate the capturing window according to a shape designated by a user.

* * * * *